May 16, 1939.  C. B. SEEM  2,158,594
DOUGH DIVIDER AND ROUNDER
Filed Dec. 3, 1937   4 Sheets-Sheet 1

Inventor
Charles B. Seem
By Church & Church
His Attorneys

May 16, 1939.   C. B. SEEM   2,158,594
DOUGH DIVIDER AND ROUNDER
Filed Dec. 3, 1937   4 Sheets-Sheet 2
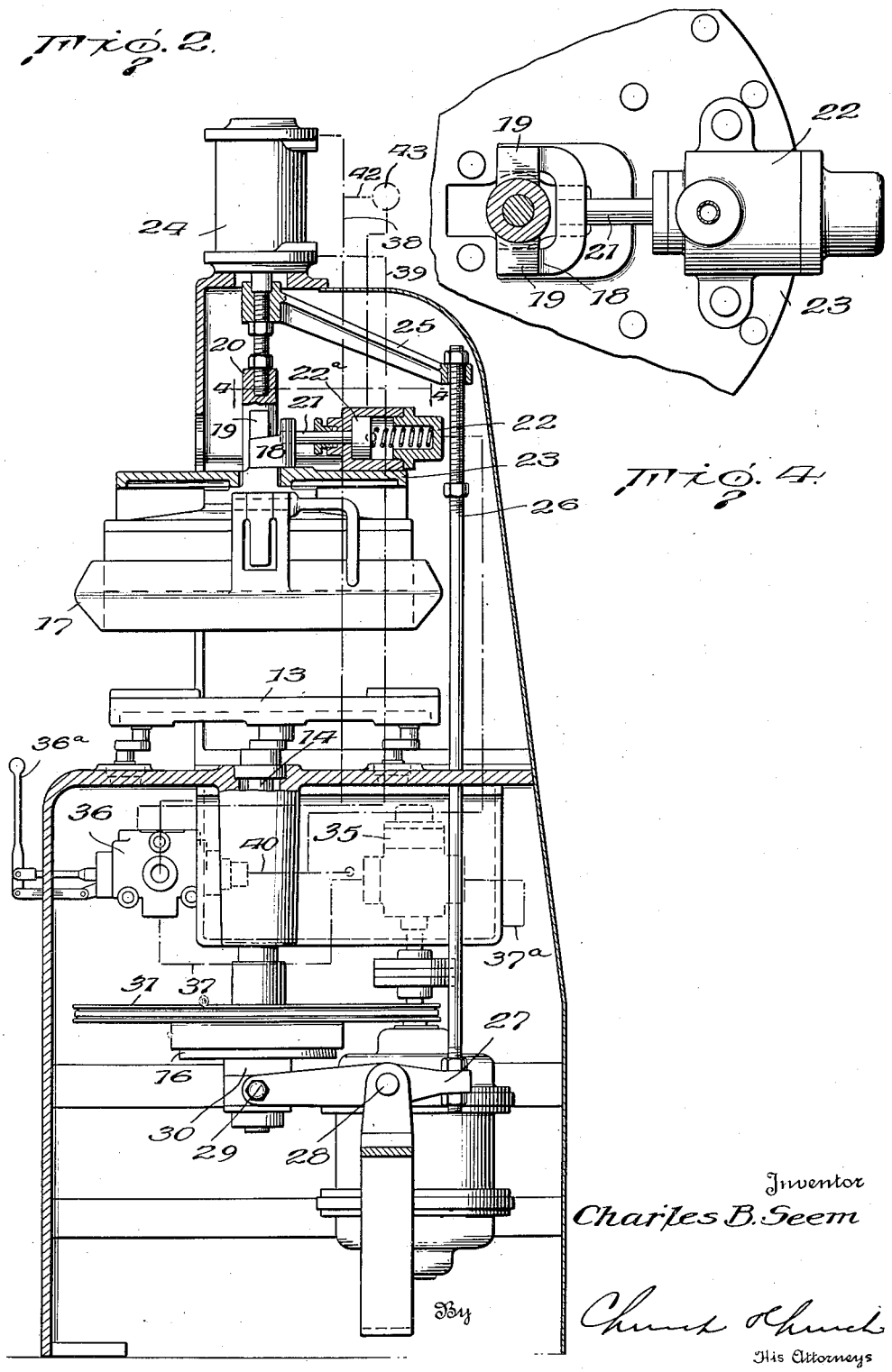
Inventor
Charles B. Seem

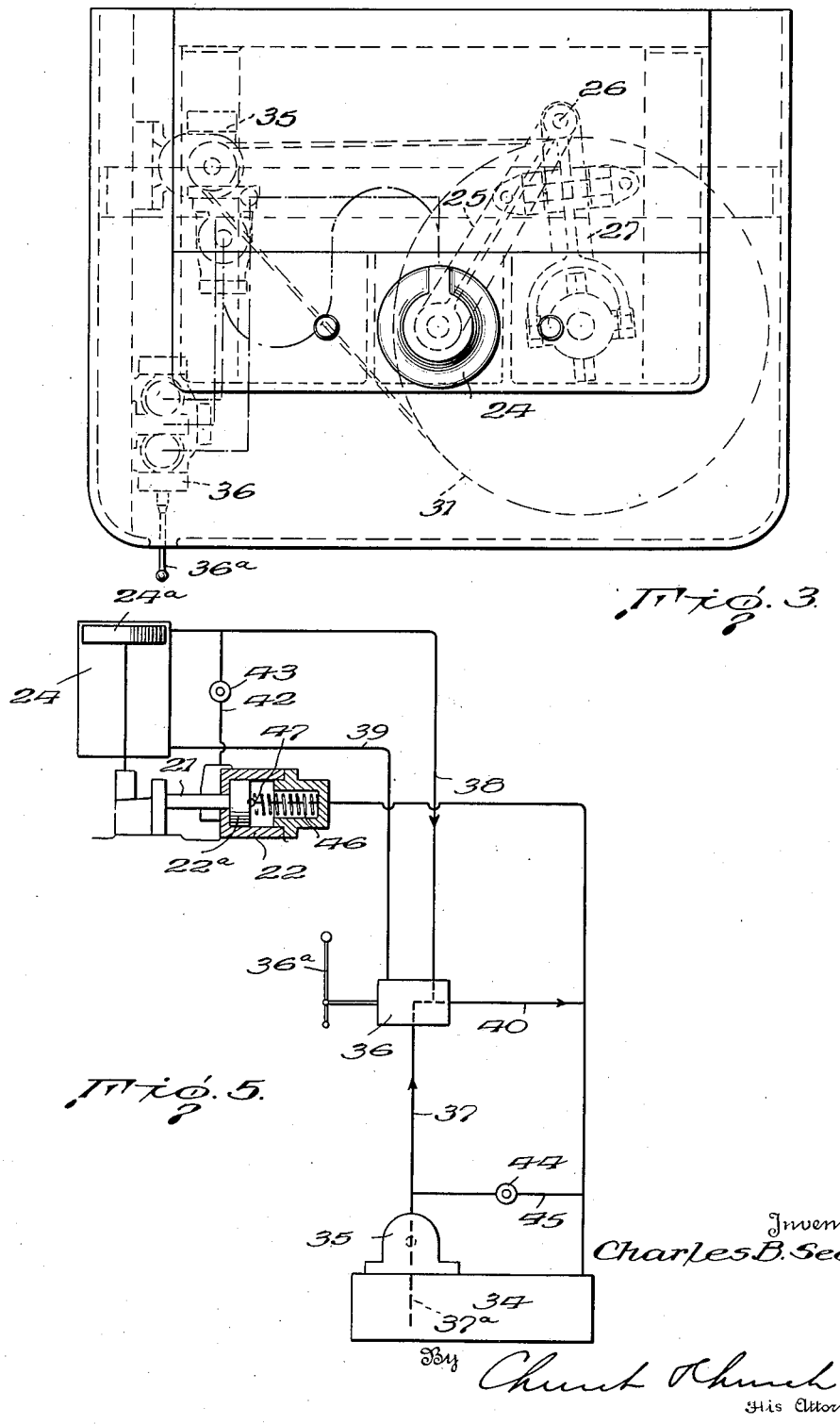

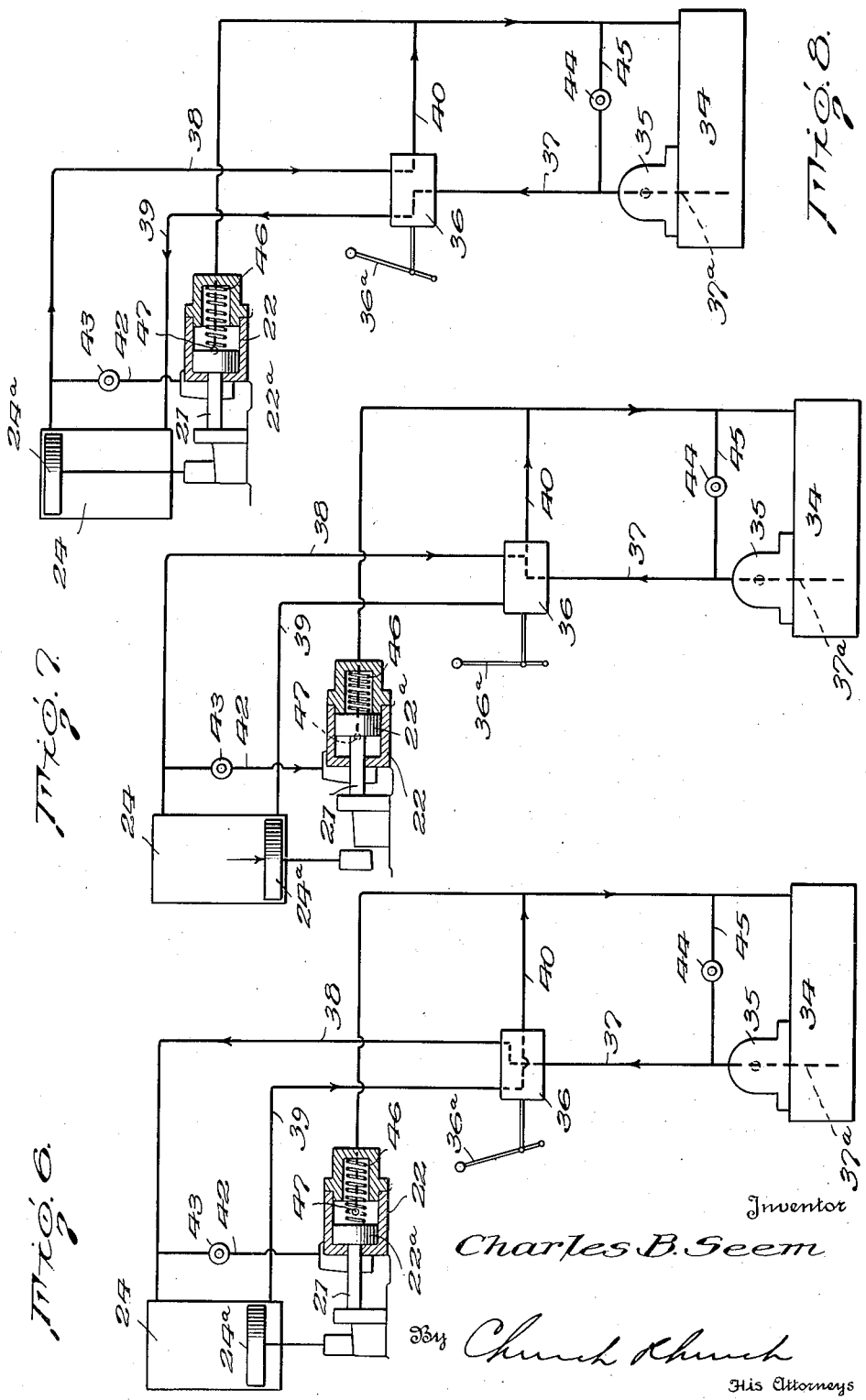

Patented May 16, 1939

2,158,594

UNITED STATES PATENT OFFICE 2,158,594

DOUGH DIVIDER AND ROUNDER

Charles B. Seem, Beacon, N. Y., assignor to Dutchess Tool Company, Beacon, N. Y., a corporation of New York Application December 3, 1937, Serial No. 177,994

7 Claims. (Cl. 107—20)

This invention relates to improvements in dough-handling apparatus and, particularly, to that type of machine known as a dough divider and rounder.

In machines of this type, a mass of dough, usually sufficient to form a pan of rolls, is placed upon a support and first pressed to impart a circular shape thereto and then subdivided into a plurality of increments, each of which will constitute a roll. In the combined divider and rounder, after the dough has thus been pressed and subdivided, the supporting surface is moved with a gyratory motion so as to roll each increment of the subdivided mass into a ball-shaped piece.

One object of the present invention is to provide a machine of this type with fluid-actuated means for applying pressure to the dough on the dough-supporting surface and for advancing the knives through the dough in the subdividing step.

A further object of the invention is to provide means responsive to the pressure imposed on the dough on the supporting surface for controlling the advancing movement of the subdividing knives.

A still further object is to provide means whereby the mechanism for gyrating the dough-supporting surface will be automatically rendered operative at a predetermined time with relation to the movement of the dividing knives through the mass of dough being subdivided.

More specifically, the invention contemplates a dough divider and rounder having what is known as a divider head comprising a plurality of presser blocks for pressing the dough on the supporting surface and a plurality of divider knives, the knives and blocks being releasably interlocked for movement as a unit toward the dough-supporting surface until the blocks have imposed predetermined pressure on the dough, whereupon the pressure-responsive means above referred to will disengage the interlock between the presser blocks and knives, thus freeing the knives, so to speak, so that they can be advanced through the mass of dough to cause the subdividing step. Where the rounding-up feature is combined with the divider, the downward movement of the support for the knives is utilized in rendering the rounding-up mechanism, i. e., the mechanism for gyrating the dough-supporting surface, operative.

With these and other objects in view, the invention consists in certain details of construction and combinations and arrangements of parts, all as will hereinafter be more fully described, and the novel features thereof particularly pointed out in the appended claims.

In the accompanying drawings—

Fig. 2 is a similar view taken from the side of the machine;

Fig. 3 is a top plan view illustrating the connection for rendering the gyrating mechanism operative;

Fig. 4 is a horizontal detail sectional view on the line 4—4 of Fig. 2; and

Figs. 5, 6, 7 and 8 are a series of diagrammatic views illustrating the connections for the fluid-actuating devices and the several positions assumed by the elements of these connections in the cycle of operation of the machine.

Figure 1:
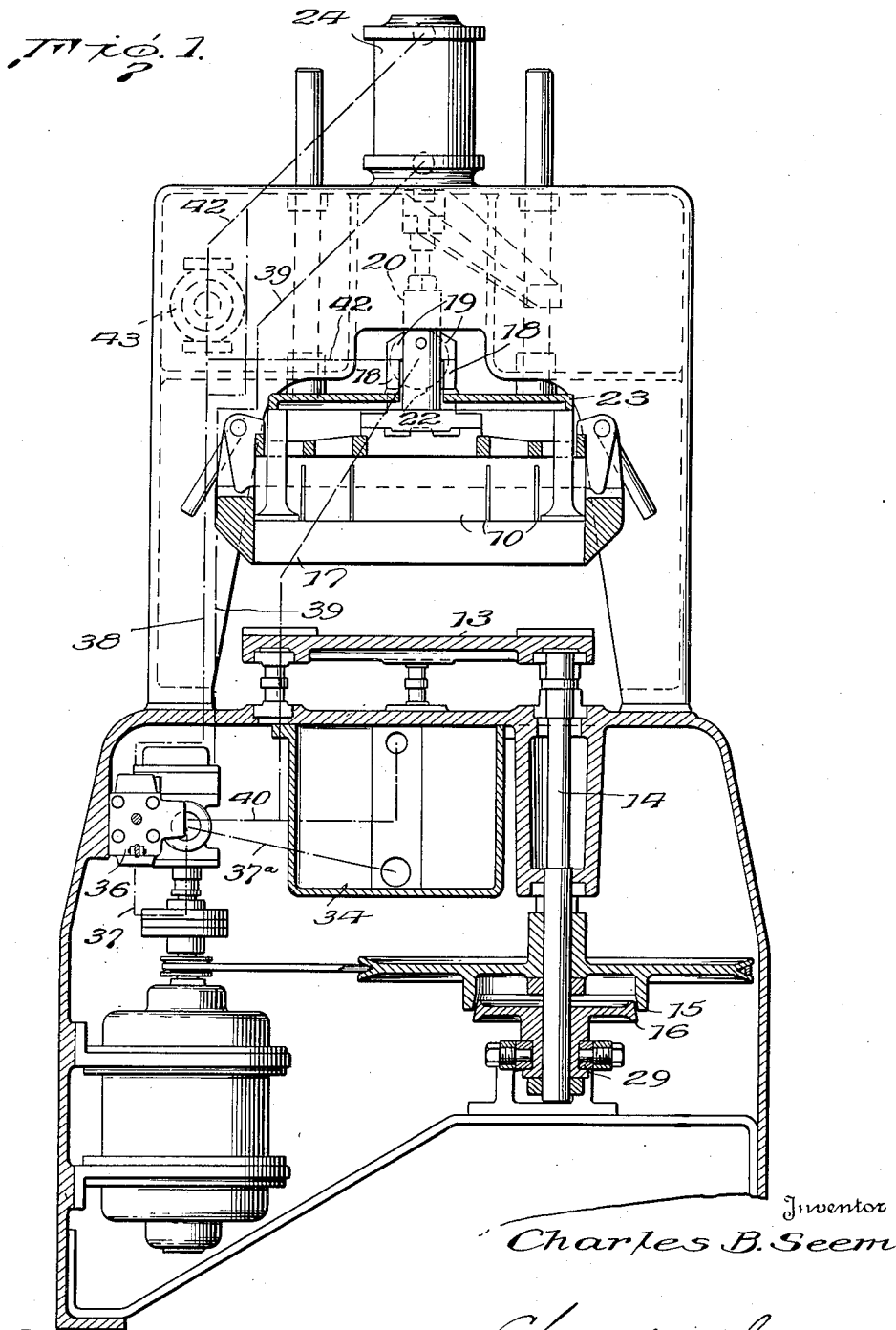
Figure 1 is a front view, partly in section, of a machine embodying the present improvement.

In accordance with usual construction of a machine of the type illustrated in the present instance, the divider head consists of a plurality of circular and radial knives 10 forming pockets in which a plurality of plungers or presser blocks 11 are located. This head is carried on a stem 12 and is adapted to move vertically toward and from a support 13 for a mass of dough to be divided and rounded up, the latter operation being accomplished by a gyratory motion imparted to the support 13 by driving connections comprising a shaft 14, a fixed clutch member 15 on said shaft and a cooperating, movable clutch member 16. The mass of dough on the support is adapted to be confined by a ring 17 loose on the divider head. Described generally, in the operation of the machine, as the divider head is lowered, the ring 17 first comes into engagement with the support 13 to confine the mass of dough as continued downward movement of the head causes the plungers 11 to press and spread the dough on the support within the ring. During the portion of the movement of the divider head, the knives and plungers are interlocked and move as a unit, but after the dough has been properly pressed, the interlock is disengaged and the knives, which up to that time had been flush with the lower surfaces of the plungers, are advanced beyond the plungers through the dough to divide the latter into a plurality of subdivisions, each of which is to ultimately constitute a roll in a pan of rolls. After this subdivision has taken place, the support 13 is gyrated to "round-up" each subdivision. As the present invention has to do more particularly with other features of the present machine, a detailed description of the construction of the divider head and the support-gyrating mechanism is believed unnecessary, especially in view of United States Letters Patent Nos. 1,177,835 and 1,764,586, dated April 4, 1916 and June 17, 1930, respectively, which fully show and describe these mechanisms.

In the present invention, the knives and plungers of the divider head are interlocked by a latch 18 slidably engaging beneath lateral projections 19 on a stem 20 whose lower end carries the knives. Latch 18 is carried on a stem 21 which is, in effect, the piston rod of a piston 22ª in cylinder 22 mounted on a plate 23 carrying the plungers. With the latch engaged beneath projections 19, the knives are flush with the plungers and move in unison therewith, but with said latch disengaged, the knives are free to move independently of the plungers.

Stem 20 is a continuation of a piston 24ª in a cylinder 24 at the top of the machine and extending laterally from the upper portion of said stem there is an arm 25 connected at its outer extremity to a depending rod 26 whose lower end is attached to one end of a lever 27 pivoted at 28. The opposite end of said lever is bifurcated and provided with inwardly projecting roller bearings 29 engaging in a groove in a sleeve 30 keyed to, but slidable on, shaft 14 of the support-gyrating drive connections. Said sleeve carries the movable clutch member 16 and, as will be apparent, by raising the bifurcated end of lever 27, the clutch can be engaged to transmit rotary motion from the driven pulley 31 to shaft 14.

Fluid under pressure is adapted to be supplied to cylinders 24 and 22 from a suitable source of supply through conduits illustrated more or less diagrammatically, the flow of this fluid being regulated by a main control valve 36 provided with a control lever 36ª. Valve 32 is an ordinary four-way valve. Its specific construction forms no part of the present invention and hence it has not been shown in detail.

Referring particularly to Figs. 5 and 8, the fluid supply tank is indicated at 34 and the pump, for supplying the fluid under pressure to the cylinders at 35. The main control valve 36, provided with operating lever 36ª is connected to the pump 35 by a conduit 37 and by conduits 38, 39, to cylinder 24. Also, a conduit 40 from said control valve is connected to the return conduit 41 leading to the supply tank. Cylinder 22 is connected to supply line 38 by a conduit 42 in which there is interposed a relief valve 43 and an exhaust port 47 in cylinder 22 is connected to the return conduit 41. A safety valve 44 is placed in a cross conduit 45 connecting the supply line 37 and return conduit 41 at points in advance of the main control valve. A spring 46 yieldingly maintains the piston in cylinder 22 advanced or in that position in which latch 18 is in interlocking engagement with the knives and plungers of the divider head and the relief valve is set to permit fluid to enter said cylinder after the pressure of fluid in cylinder 24 through conduit 38 has built up to a predetermined point. In other words, fluid entering the upper end of cylinder 24 must depress the piston in said cylinder and exert, say, two hundred (200 lbs.) pounds of pressure thereon before the relief valve will open and admit fluid to cylinder 22.

Assuming the several parts to be in the position indicated in Fig. 5, under which circumstances the knives 10 and plungers 11, interlocked by latch 18, are in their elevated position, and the clutch members 15, 16, of the mechanism for gyrating support 13, are disengaged, the cycle of operation of the machine will now be described.

Operating lever is moved from its neutral position (Fig. 5) to the position shown in Fig. 6, to place conduit 38 in communication with supply conduit 37 and line 39 in communication with exhaust line 41. Fluid is thus pumped into the upper end of cylinder 24, depressing the piston therein and, consequently, the interlocked knives and plungers of the divider head which, as before mentioned, are carried on stem 20 connected to said piston. This downward movement of the divider head first positions the ring member 17 around the body of dough on the dough-supporting surface and then forces the plungers against the dough to compress and uniformly distribute it on the area of said surface defined by the ring. This downward movement of the knives and plungers continues until the predetermined pressure is exerted on the dough, at which time relief valve 43 will open and admit fluid to cylinder 22. This retracts piston 22ª against the pressure of spring 46 and disengages latch 18 freeing the knives 10 from plungers 11, whereupon the piston 24ª in cylinder 24 is further depressed (Fig. 7) to project the knives through the mass of dough on the support. At this point, the control lever is restored to neutral position because, as the stem 20 approaches the lower limit of its downward movement, the clutch members will have been moved into engagement and the divider head should be held depressed to confine the several lumps or increments of dough during the "rounding-up" operation, which is effected by the gyratory motion of the supporting surface. During this period, the position of valve 36 will be such that pressure will be maintained on the pistons and excess fluid will return to supply tank 34 through conduits 40, 41.

When this rounding-up operation has been finished, control lever 36ª is moved to what might be termed its reverse position (Fig. 8), under which conditions valve 36 will be positioned to connect conduit 37 with conduit 39 leading to the lower end of cylinder 24 for raising piston 24ª and the entire divider head. At the same time, conduit 38 will be connected to return conduit 41 to exhaust the upper end of cylinder 24 and cylinder 22 will exhaust through port 47, by reason of the action of spring 46 on the piston 22ª. This movement of piston 22ª restores latch 18 to its locking position. These are the original, normal positions of the pistons and their connected parts and when so restored, control lever is likewise restored to its neutral position (Fig. 5) to retain the several devices in their normal position to permit removal of the batch of worked dough and its replacement by a fresh mass of dough.

It will be readily appreciated that this arrangement greatly simplifies the operation or, rather, the control of the operations of machines of the type disclosed. The operator is not called upon to judge when the knives should be released and advanced beyond the plungers for subdividing the dough. This step is not only initiated and performed automatically by reason of relief valve 43, but the mere setting of this valve causes said step to be performed during successive cycles of operations under uniform conditions. Likewise, the mechanism for imparting the gyratory motion to the dough support is brought into action automatically.

What I claim is:

1. In a dough divider comprising a dough-supporting surface, a plurality of presser blocks, a plurality of divider knives, means releasably interlocking said blocks and knives, fluid-actuated means for advancing said blocks and knives toward said surface for pressing and subdividing a mass of dough on said surface, means for by-passing fluid supply to said fluid-actuated means, and means operable by the by-passed fluid for releasing said interlocking means whereby the knives may be advanced beyond the blocks to complete the subdivision of the mass of dough.

2. In a dough divider comprising a dough-supporting surface, means for applying pressure to a body of dough on said surface, means for dividing said body of dough into a plurality of subdivisions, and means for releasably locking said presser means and dividing means for simultaneous movement toward said surface, fluid-actuated means for moving said interlocked pressing and dividing means toward said surface, a second fluid-actuated means for disconnecting said pressing and dividing means, and means for by-passing fluid from the first fluid-actuated means to said second fluid-actuated means said divider means when released being movable toward said surface by the first-mentioned fluid-actuating means independently of said pressing means.

3. In a dough divider comprising a dough-supporting surface, a set of presser blocks movable to and from said surface, a set of knives movable to and from said surface, and means releasably connecting said two sets of devices together, fluid-actuated means for advancing said connected sets toward said surface, a second fluid-actuated means for disconnecting said sets to permit advance of one of said sets independently of the other, and means responsive to the pressure exerted by said blocks on dough supported on said surface for by-passing fluid from the first fluid-actuated means to said second fluid-actuated means.

4. In a dough divider, the combination of a dough-supporting surface, a divider head comprising a plurality of plunger blocks and divider knives, means releasably interlocking said plungers and knives for movement as a unit toward said surface, a fluid-operated piston for moving said head with the plungers and knives as a unit toward said surface, a fluid supply line for said piston, and a second fluid-operated piston for actuating said interlocking means to disconnect said plungers and knives whereby the latter may be moved independently of each other.

5. In a dough divider, the combination of a dough-supporting surface, a divider head comprising a plurality of plunger blocks and divider knives, means releasably interlocking said plungers and knives for movement as a unit toward said surface, a fluid-operated piston for moving said head with the plungers and knives as a unit toward said surface, a fluid supply line for said piston, and a second fluid-operated piston for actuating said interlocking means to disconnect said plungers and knives, a second fluid supply line for said second piston communicating with the first supply line, and a one-way valve in said second supply line movable to open position upon accumulation of a predetermined pressure on the first-mentioned piston and plunger blocks.

6. In a dough divider and rounder, the combination of a dough-supporting surface, mechanism for imparting a gyratory motion to said surface, a plurality of presser blocks, a plurality of divider knives, a fluid-actuated piston connected to said blocks and knives for advancing said elements toward said surface, said blocks and knives being releasably interlocked during the initial portion of their movement toward said surface, a second fluid-actuated means for releasing said knives from said blocks, whereby the knives may be advanced independently of the blocks, means responsive to the pressure of said blocks on a mass of dough on said support for by-passing fluid from the first fluid-actuated means to said second fluid-actuated means, and means connected to the first-mentioned fluid-actuated means and operable upon the continued advance of said knives for rendering said surface-gyrating mechanism operative.

7. In a dough divider and rounder, the combination of a dough-supporting surface, mechanism for imparting a gyratory motion to said surface, a plurality of presser blocks, a plurality of divider knives, a fluid-actuated piston for advancing said blocks and knives toward said surface to press and subdivide a mass of dough on said surface, releasable means for interlocking said blocks and knives for advancement as a unit, a second fluid operated piston responsive to the pressure of said blocks on said mass of dough for releasing said interlocking means whereby the knives may be advanced beyond said blocks, and means operable by the first-mentioned piston during the advance of the knives beyond the blocks for rendering the surface-gyrating mechanism operative.

CHARLES B. SEEM.